(No Model.)  J. W. CAMPBELL.  3 Sheets—Sheet 1.
PLANTER.
No. 526,436. Patented Sept. 25, 1894.
Figure 1.
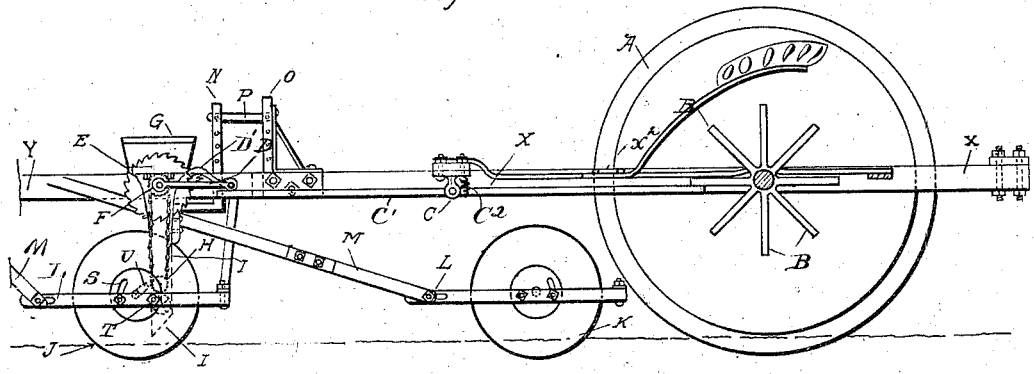
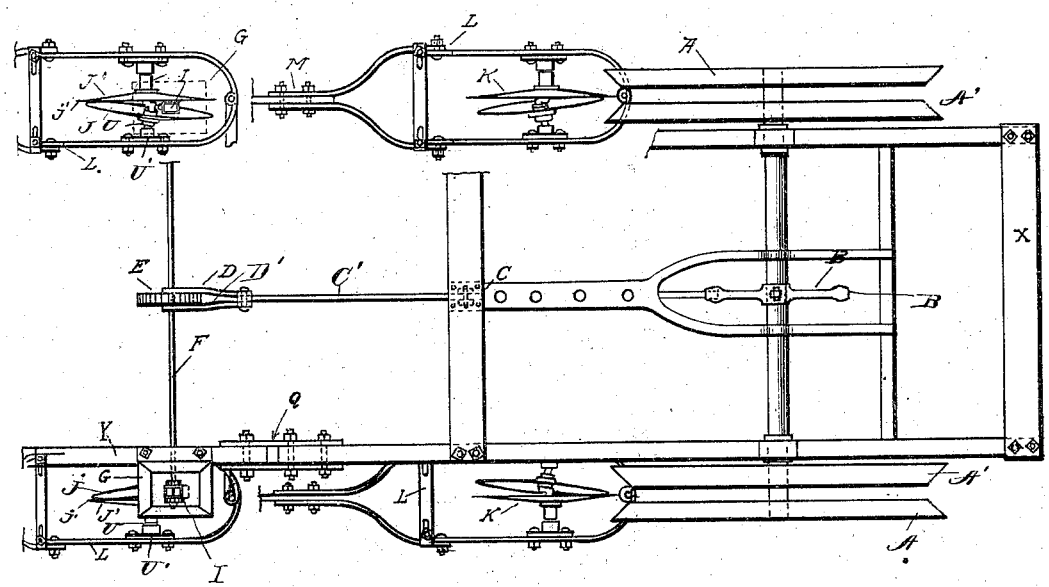
Figure 2.
Witnesses:
Thomas Durant.
Wallace Murdock.
Inventor,
James W. Campbell
by Church & Church
his Attys (No Model.) 3 Sheets—Sheet 2.
J. W. CAMPBELL.
PLANTER.
No. 526,436. Patented Sept. 25, 1894.
Figure 3.
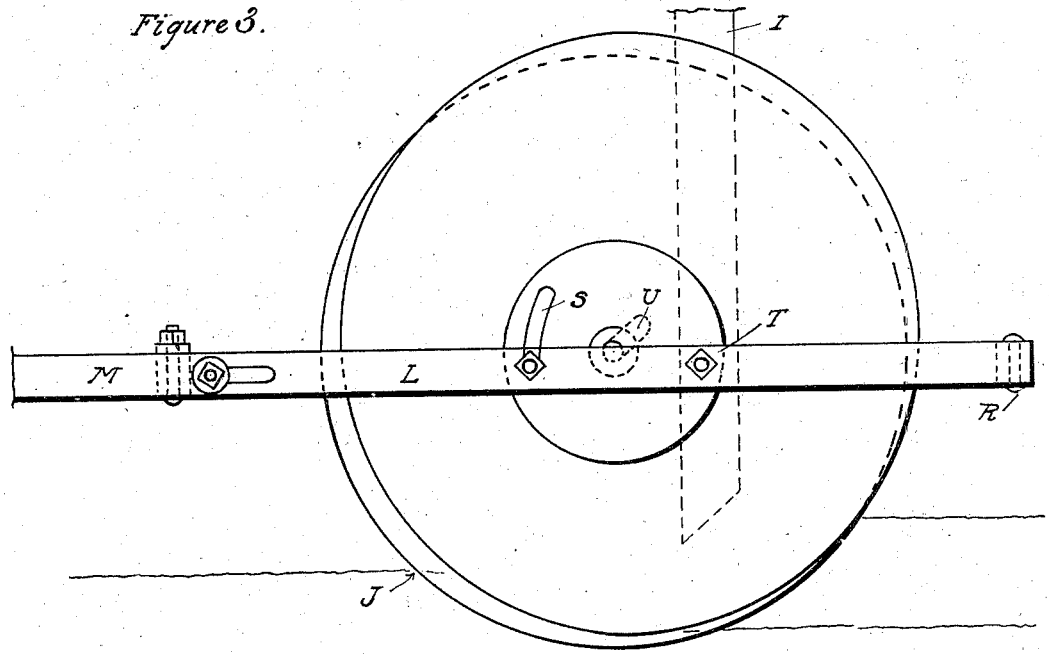
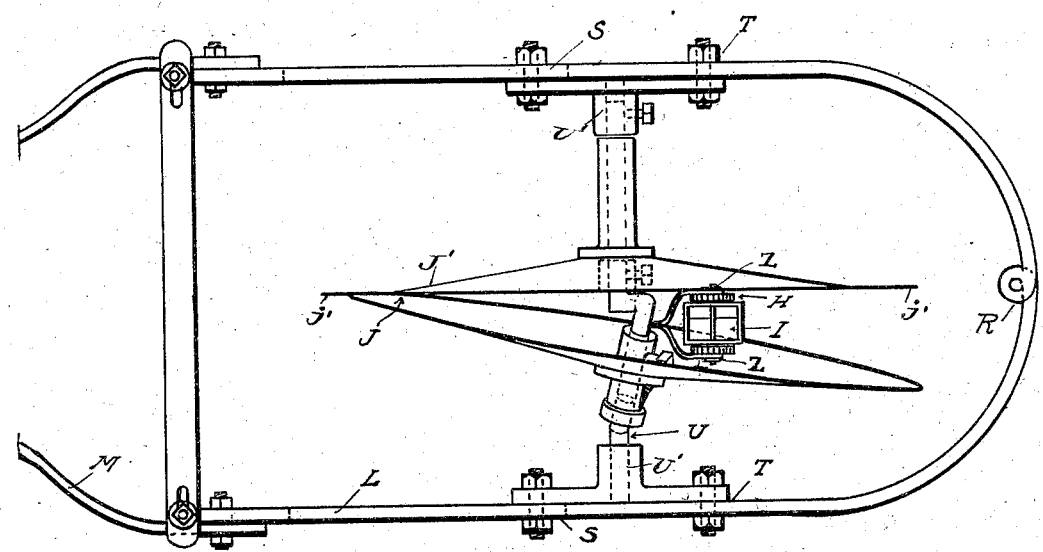
Figure 4.
Witnesses:
Thomas Durant
Wallace Murdock
Inventor,
James W. Campbell
by Church & Church
his Attys

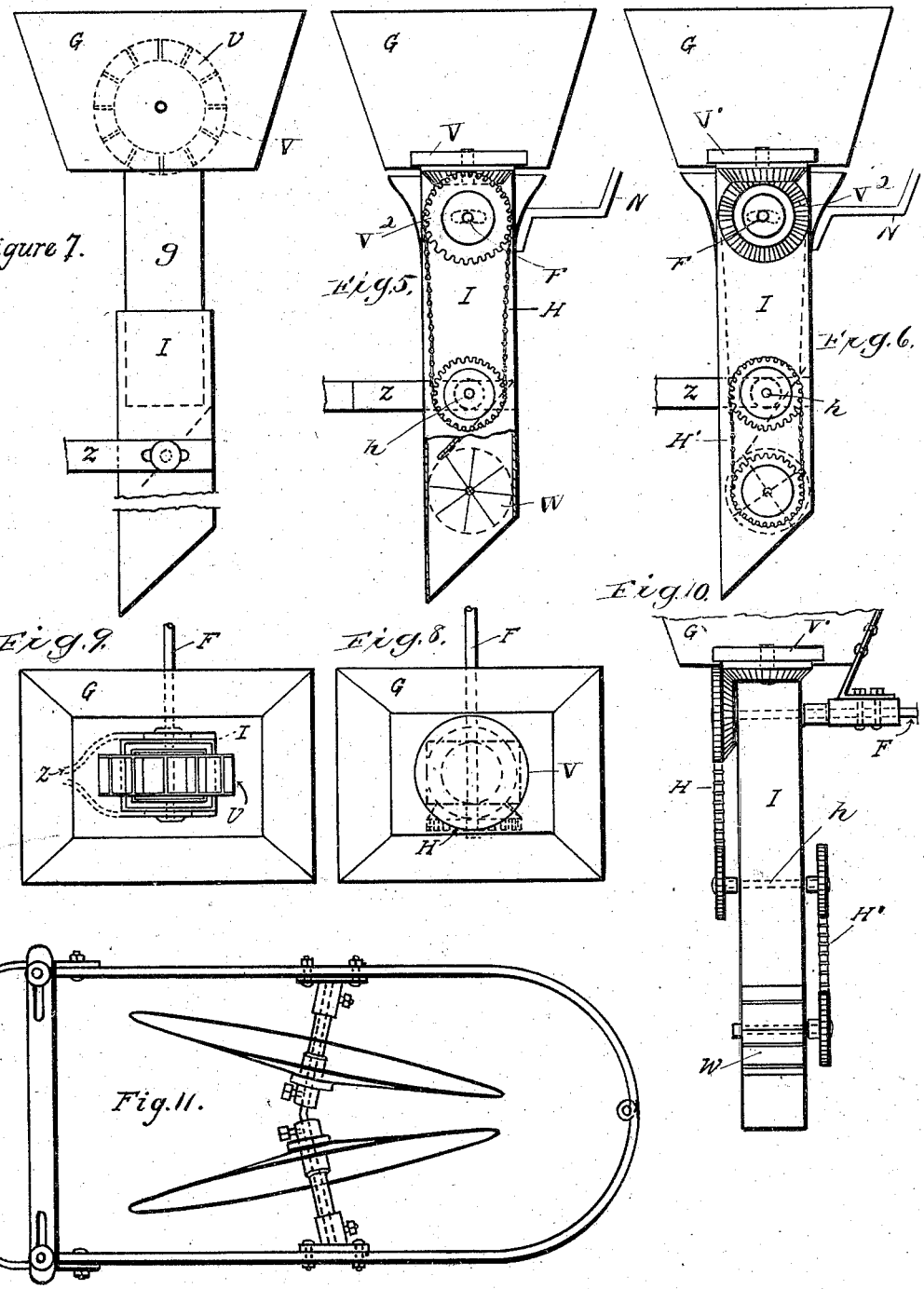

UNITED STATES PATENT OFFICE.

JAMES W. CAMPBELL, OF URSA, ILLINOIS.

PLANTER.

SPECIFICATION forming part of Letters Patent No. 526,436, dated September 25, 1894.

Application filed February 19, 1894. Serial No. 500,650. (No model.)

*To all whom it may concern:*

Be it known that I, JAMES W. CAMPBELL, of Ursa, in the county of Adams and State of Illinois, have invented certain new and useful Improvements in Planters; and I do hereby declare the following to be a full, clear, and exact description of the same, reference being had to the accompanying drawings, forming a part of this specification, and to the letters of reference marked thereon.

This invention relates to improvements in planters, and particularly to corn planters, although features of the invention are equally applicable to other kinds of planters, drills, &c., as will at once appear to those skilled in the art.

The invention consists in certain novel details of construction and combinations and arrangements of parts all as will be now described and pointed out particularly in the appended claims.

Referring to the accompanying drawings: Figure 1 is a longitudinal section through a corn planter constructed in accordance with my invention. Fig. 2 is a top plan of the same with portions broken away to illustrate underlying parts. Figs. 3 and 4 are a side elevation and a top plan respectively of the opening disks which carry the seed tubes.
Figs. 5 and 6 are views looking at opposite sides of the seed tubes, a portion of the farther one being broken away to show the lower feed or valve wheel. Fig. 7 is an elevation of a modified form of seed tube. Figs. 8 and 9 are top plans of Figs. 5 and 7 respectively. Fig. 10 is a front elevation of one of the seed tubes. Fig. 11 is a top plan of the covering disks.

Like letters of reference in the several figures indicate the same parts.

The framing of this machine may be of any preferred style, but it is preferably similar to that described in my Patent No. 519,986, dated May 15, 1894, that is to say a frame X is mounted on ground wheels A and is connected at the forward end by a hinge connection with a runner frame Y, the latter being supported by the tongue in the usual manner and by the opening disks carried by the adjustable frame L M depending from the runner frame.

The seed boxes G are carried by the runner frame and have the usual or any preferred form of feeding mechanism, such as the wheels V or V', for discharging a given quantity of seed periodically or continuously through the bottom of the hopper and into the upper ends of seed tubes I, the latter being supported, preferably pivotally, on the disk axle through the medium of hanger bearings Z, for a purpose which will presently appear.

The seed wheels V' are provided with bevel gears on the under side (Figs. 5 and 6) which mesh with similar gears $V^2$ rigidly mounted on a transverse shaft F. Hence as said shaft is rotated, a movement is given to the seed wheels to secure the necessary feed, and in order to impart this rotary movement to the shaft periodically, so as to feed in check, I provide the shaft with a ratchet wheel E having a yoke D journaled on each side thereof and carrying at its outer end a pawl D' engaging with the teeth of the ratchet wheel which, when moved upward, locks the wheel and yoke for simultaneous movement. The yoke D normally rests on the end of a lever C' pivoted at C and extended back into proximity to the axle of the ground wheels where it is adapted to be struck and depressed by a series of arms or projections B secured in the form of a wheel to the said rotary axle. Hence as the machine travels forward the lever C' will be periodically operated and will through the pawl and ratchet wheel rotate the transverse feed wheel shaft and seed wheels periodically, the intervals, relative to the movement of the whole machine, of course being controlled entirely by the distance apart of the arms B.

The soil opening disks J, J', in my former application are mounted on a bent axle and both stand at an angle to the line of movement of the machine, but in the present instance only one of the disks J stands in this way, while the other J' forms the cutter proper and stands in a plane parallel with the direction of movement of the planter. To attain this end with as simple mechanism as possible, one end only of the axle U on which the disks are journaled is arranged at an angle to the direction of movement of the vehicle, while the other end remains at right angles to the line of movement. One disk J' is journaled on the straight portion and the other J is journaled on the angular portion. Thus the edges of the disks are brought together, and by rotating the bearings U' in which the axle U is rigidly mounted, the point at which the disks come together may be shifted up or down. To hold the bearings in adjusted position a bolt T is passed through the flange and frame at one side, and a corresponding bolt passes through the frame on the opposite side and through a slot S in the flange, and by loosening the latter bolt, the bearing may be shifted as described.

By reference to Fig. 4 it will be seen that in the preferred form, the disk J' mounted on the straight portion of the axle is provided with a straight flange j' projecting beyond the edge of the dished central portion and the edge of the co-operating dish-shaped disk J, contacts with or approaches it most closely at about the base of the flange, or at least some distance from its edge. The disk J' is thus made to perform the function of a colter to open the soil and in addition by being arranged in the line of movement it prevents all side draft.

The covering disks are arranged in rear of the opening disks preferably in independent frames and reversely so as to draw the earth together in position to be acted on by the ground wheels, but it is obvious that the covering disks may be entirely omitted if desired and any of the ordinary means employed to cover the seed, or for that matter the ground wheels alone may answer this purpose especially when constructed double or with the center portion cut away, as shown at A A', Fig. 2, with the peripheries of the sections beveled inward so as to draw the earth together and leave it in a light ridge over the seed previously deposited by the seeding mechanism.

The seed tubes I into which the seed is dropped by the operation of the feed wheels as before described, extend down between the opening disks, and in the preferred construction are as before stated, pivotally supported by bearings Z, secured to the axle of the disks, and they are maintained in upright position by an upwardly projecting arm N connected by a link P with a rigid upright standard O on the main frame X. The link connection is adjustable vertically as shown in Fig. 1. Thus the tube is maintained in proper vertical position so as to drop in check, irrespective of slight irregularities in the surface of the ground, for as the angle of the two frames changes with relation to each other the relative angle of the seed tube is correspondingly varied through the medium of the link connection.

To secure the correct checking of the seed it is found necessary to provide a valve at the bottom of the seed tubes, and I prefer to employ pocket wheels W, Figs. 5 and 10, for retaining the seed at the bottom of the tubes until the proper time for discharging, and to operate these wheels from the transverse shaft F through the medium of sprocket wheels and chains. In order to prevent interference with the swinging of the seed tubes, shaft $h$ is arranged centrally of the tubes and provided with sprocket wheels on each end. A chain H unites one of these wheels and the wheel $V^2$ on the transverse shaft and a chain H' unites the other wheel and the corresponding wheel on the valve or pocket wheel shaft as will be readily understood by reference to Figs. 5, 6 and 10.

In Fig. 7, the link connection with the seed tube is not shown and instead, a tubular prolongation $g$ of the hopper or seed box is provided and the seed tube telescopes with this extension being thus readily adjustable with the disks but at the same it is maintained in an upright position by the tube extension $g$.

The frames in which the disks are mounted may be adjusted to cause the disks to travel deeper or close together or far apart according to the character of the soil and the kind of seed being planted. For covering, the disks need never run together and may be reversed as shown in Fig. 11, $i.\ e.$, have their dished sides outward, thus exerting more of a drawing action on the surface soil without disturbing the position of the seed.

Any arrangement for the driver's seat may be employed, but I prefer to secure a longitudinal frame $X^2$ to suitable cross pieces and adjustably mount the seat on this frame so as to be capable of adjustment to front or rear to put the machine in proper balance and prevent driving the disks too deeply into the ground.

The whole planter, it will be seen from the foregoing is simple in its construction and operation; it is adapted for use in soil of any character and will plant accurately and cover to a uniform depth.

Having thus described my invention, what I claim as new is—

1. In a planter the combination with the ground wheels, axle and radial arms or projections adapted to rotate with the axle, of the seed feeding mechanism, the transverse rotary shaft for operating the same, the ratchet wheel on said shaft, the yoke frame and pawl carried thereby cooperating with the ratchet wheel and the pivoted lever moved by the arms and cooperating with the yoke frame to reciprocate the same and intermittingly rotate the transverse shaft; substantially as described.

2. In a planter, the combination with the ground wheels, axle and radial arms or projections carried by and rotating with the axle, of the seed feeding mechanism, the transverse rotary shaft for operating the same, the ratchet wheel mounted on said shaft, the yoke frame journaled on the shaft, the pawl carried by the yoke frame and cooperating with the ratchet wheel, and the centrally pivoted vertically swinging lever underlying the yoke frame at the forward end and having its rear end in position to be struck and depressed by the arms on the axle; substantially as described.

3. In a planter, the combination with the frame and seed feeding mechanism, of the opening disks carried by the frame, the seed tube passing down between the disks and pivotally connected to the axle thereof with means for holding the seed tubes in vertical position; substantially as described.

4. In a planter, the combination with the main frame, the runner frame hinged thereto and the seed feeding mechanism, of the opening disks carried by the runner frame, the seed tubes pivotally connected with the axles of the disks, upwardly extending arms on the seed tubes and connections between said arms and the main frame, whereby the tubes are kept in vertical positions; substantially as described.

5. In a planter, the combination with the frame and the seed feeding mechanism, of the rotary opening disk journaled to rotate in the plane of movement of the machine and the cooperating disk having its axis set at an angle to the axis of the first mentioned disk; substantially as described.

6. In a planter, the combination with the frame and the seed feeding mechanism of the disk journaled on an axis to rotate in the plane of movement of the machine and the cooperating disk set at an angle thereto and having its periphery in proximity to the first mentioned disk at a point in rear of its forward edge, whereby the straight disk forms a cutting colter; substantially as described.

7. In a planter, the combination with the frame and the seed feeding mechanism, of the disk having the straight or plane faced flange and journaled on an axis to rotate in the plane of movement of the machine and the cooperating disk set at an angle thereto; substantially as described.

8. In a planter, the combination with the frame and the seed feeding mechanism, of the disk having the straight or plane faced flange and journaled on an axis to rotate in the plane of movement of the machine, and the cooperating disk set at an angle thereto and having its periphery in proximity to the first mentioned disk at the inner side of the flange whereby the flange forms a colter or cutter; substantially as described.

9. In a planter, the combination with the main frame, the runner frame hinged thereto and the seed feeding mechanism, of the seed tubes down which the seed are fed pivoted at an intermediate point to swing in the plane of movement of the planter and having an upwardly extending arm, a standard on the main frame and an adjustable connection between the standard and arm on the seed tube, whereby the tube may be maintained in vertical position; substantially as described.

10. In a planter the combination with the frame, seed hoppers, feed wheels and transverse rotary shaft for operating the feed wheels, of tubes down which the seed is fed, rotary valves or pocket wheels in the lower ends of the tubes, and sprocket wheels and chains connecting said valve wheels and the transverse shaft and means for intermittingly rotating the transverse shaft; substantially as described.

11. In a planter, the combination with the frame seed hoppers, feed wheels and transverse rotary shaft with means for intermittingly rotating the same, of tubes down which the seed is fed pivoted at an intermediate point, shafts at the pivotal points, valves or pocket wheels driven from said shafts and sprocket wheel and chain connections between the said shafts and the transverse rotary shaft; substantially as described.

JAMES W. CAMPBELL.

Witnesses:
 GEO. H. WILSON,
 JAMES F. CARROTT.